FIG.3

Aug. 5, 1952    R. E. REASON    2,606,093
RECORDING APPARATUS
Filed March 4, 1947    6 Sheets-Sheet 5

Inventor
Richard Edmund Reason
Attorney

Patented Aug. 5, 1952

2,606,093

UNITED STATES PATENT OFFICE 2,606,093

RECORDING APPARATUS

Richard Edmund Reason, Leicester, England, assignor to Taylor, Taylor & Hobson Limited, Leicester, England, a company of Great Britain Application March 4, 1947, Serial No. 732,291
In Great Britain March 4, 1946

21 Claims. (Cl. 346—116)

This invention relates to improved recording apparatus of the kind comprising a pen or marker movable about a pivot in accordance with a value whose variations are to be plotted on a recording surface or chart, the angular movement of the pen, and relative movement between the pen and chart, being in accordance with two coordinates respectively which are usually represented by the said varying value and time.

One object of the invention is to provide improved recording apparatus wherein the coordinate derived from the marker will be applied truly rectangularly and on a linear scale, while the weight of the marker, more particularly at its tip, can be reduced to a minimum, recording being effected either by rectangular or by polar coordinates.

Whether recording is effected by rectangular or by polar coordinates, there is a risk of damage to the marker and to the recording surface should movement of the latter relatively to the marker take place in a reverse direction, that is to say in a direction opposite to the normal or forward movement. When the tip of the marker is constituted by a fine wire such as that used for inkless marking, such risk becomes particularly pronounced while, moreover, the wire tip is liable to be bent when loading a recording strip or chart into the recorder and accidentally moving the strip in a direction which is the reverse of its normal forward feed. A further object of the invention is to provide control means whereby such risk will be reduced or obviated.

Any suitable form of marking may be utilized, such for example as ink, pencil, or scribing on wax paper or by electric arc. When ink marking is employed, however, and the marker or pen is supplied with ink through a flexible tube, there may be a tendency for the pen to be biassed towards or away from the recording surface by a residual set in the flexible tube. Yet a further object of the invention is to provide means whereby any such residual set or bias is reduced to a minimum or eliminated.

Other objects of the invention will become apparent from the appended claims and the following description of the accompanying drawings, in which

Figure 1:
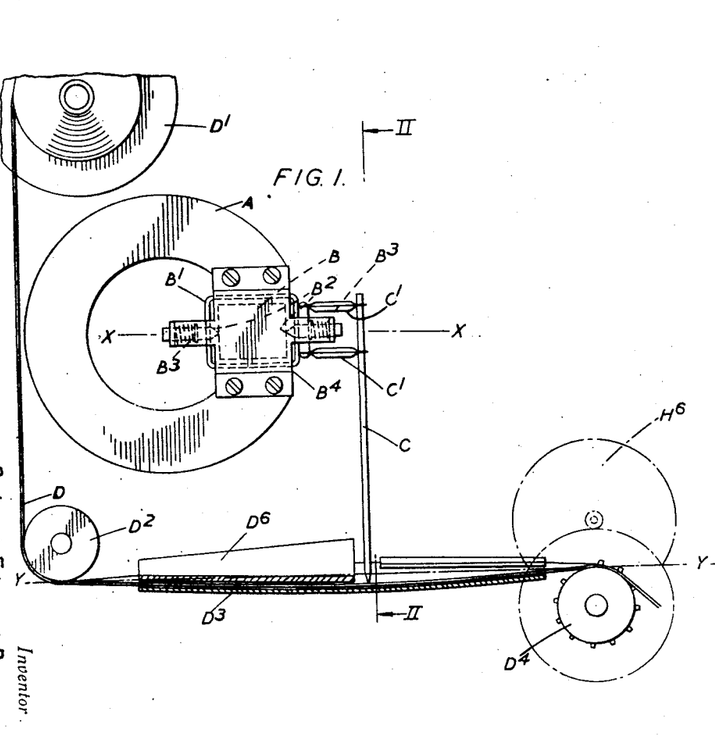
Figure 1 illustrates one form of electrically actuated pen recorder in side elevation with part cut away.
Figure 2:
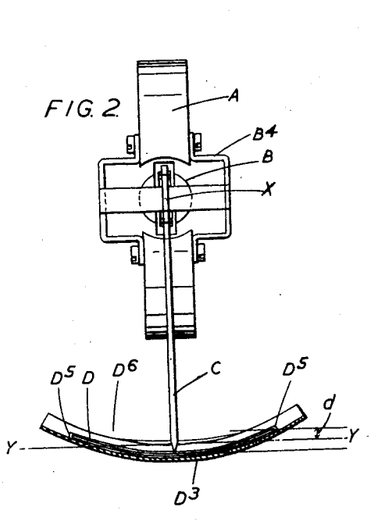
Figure 2 is a section on the line II—II of Figure 1.

In the construction shown in Figures 1 and 2 the electrically operated recorder comprises a permanent magnet A of the horse-shoe type between the pole pieces of which is arranged a cylindrical soft iron core B embraced by a coil $B^1$ pivoting about the longitudinal axis X—X of the core B so that as shown in Figure 2 the coil $B^1$ lies, and is angularly movable in, the air gap of the magnet A. The pivots $B^2$ of the coil $B^1$ are connected by spiral springs $B^3$ to a supporting frame $B^4$ of non-magnetic material and secured to the magnet A, the outer end of the coil unit carrying two spring ligaments $C^1$ disposed one above the other so that the springs can flex vertically but are rigid horizontally. The two spring ligaments $C^1$ are connnected to the upper end of a pen arm C which is thus suspended from the ligaments $C^1$. The pen arm C is thus free to rise and fall on the spring ligament support $C^1$, whilst angular movement of the pen arm about its horizontal pivot or axis of oscillation X—X is positively transmitted thereto from the coil unit $B^1$ through the spring ligaments $C^1$.

The recording surface or chart D is constituted by a flexible strip of paper or other suitable material drawn from a supply spool $D^1$, round a feed or idler roll $D^2$ and through a guide $D^3$, by a take-up sprocket $D^4$ driven by an electric motor indicated at $H^6$ through a suitable reduction gearing, a horizontal median plane Y—Y of the guide $D^3$ being substantially tangential to the feed roll $D^2$ and driving sprocket $D^4$. The guide $D^3$ comprises a dished or trough-like base whose inner surface is curved about the axis of oscillation X—X of the coil $B^1$, that is to say the axis of oscillation of the pen arm C, so that in spite of the finite length of the pen arm C the tip of the pen will tend to conform to the cylindrical inner surface of the guide $D^3$ throughout the range of arcuate movement of the pen. With a view to ensuring even tension of the paper strip D within the guide $D^3$ and transversely to the direction of movement of the strip D therethrough, the longitudinal edges of the trough-like guide $D^3$, that is to say the grooves or slots $D^5$ of the guide which locate the edges of the strip D, lie at a distance $d$ above the horizontal median plane Y—Y while the inner lower part of the cylindrical part of the surface lies somewhat below the median plane. Thus, as the strip D enters the guide $D^3$ from the feed roll at the level of the median plane Y—Y, the guide $D^3$ flexes the strip D laterally to conform to the curvature of the guide surface $D^3$ so that the part of the paper strip D immediately beneath the pen C is curved downwards with the pen axis X—X as centre.

In practice, quite a short length of guide has been found to be sufficient and, indeed, for many purposes little more than an arcuate slot, adjacent to the tip of the pen, and having a length of no more than a few tenths of an inch, will often prove sufficient. In order to allow for small lumps in the paper or other recording surface and at the same time to avoid the need for an excessively wide guide slot, one of the elements bounding the slot may be stiff and rigidly positioned while another bounding element may be yieldable or radially springy. In one analogous arrangement the recording chart may be urged against a plate by means of springs or spring-operated balls or plungers.

The guide $D^3$ may be so formed that the paper strip D lying therein is visible from above throughout the length of the guide, but as shown in Figures 1 and 2 the guide is enclosed by a cover $D^6$ at and towards the end of entry but open towards the delivery end, i. e. from the pen C to the outlet end where the recorded strip D is drawn out by the sprocket $D^4$.

It will be seen that with this construction not only the coordinate derived from the longitudinal movement of the strip D relatively to the pen C, but also the coordinate derived from the angular oscillation of the pen C is truly rectangular since the path of the pen point is always at right angles to the said longitudinal movement of the strip D. Moreover, the effective length of the pen C remains constant throughout the range of arcuate travel thereof, so that the coordinate derived from the angular movement of the pen C will be recorded on a linear scale, the pen supporting ligaments $C^1$ giving positive transmission between the coil $B^1$ and the pen arm C which is however free to move vertically under the effects of any irregularities of the recording surface D. The pen unit proper, i. e. the pen arm C and scribing tip, can thus be made as light as may be desired, the scribing point having no attachments liable to increase the mass or inertia at the pen tip.

Though it is preferred to employ the recorder with the pen C swinging about a horizontal axis X—X and the recording surface D moving horizontally parallel to such axis where it contacts with the pen, it will be apparent that the recorder may be used with the pen C swinging about a vertical or other axis while the recording strip D moves vertically or otherwise where it contacts with the pen.

Though in the construction above described the pen arm C is freely movable transversely to the axis X—X of oscillation of the pen by reason of the spring ligament support $C^1$, an even more sensitive "touch" may be obtained by connecting the upper end of the pen arm C to the coil unit through a vertical spring ligament (or ligaments) forming a subsidiary pivot. For example, in the arrangement shown in Figures 3 and 4, the vertical ligaments $C^2$ are free to flex in a direction generally parallel to the axis of oscillation X—X of the pen C which is bent forwards (i. e. in the direction of movement of the recording strip D) so that the arm is inclined, say by an angle of 30° or 40°, to the vertical. The lower end $C^4$ of the pen $C^3$ is then preferably bent down so as to be approximately normal to the surface of the recording strip D.

Figure 4:
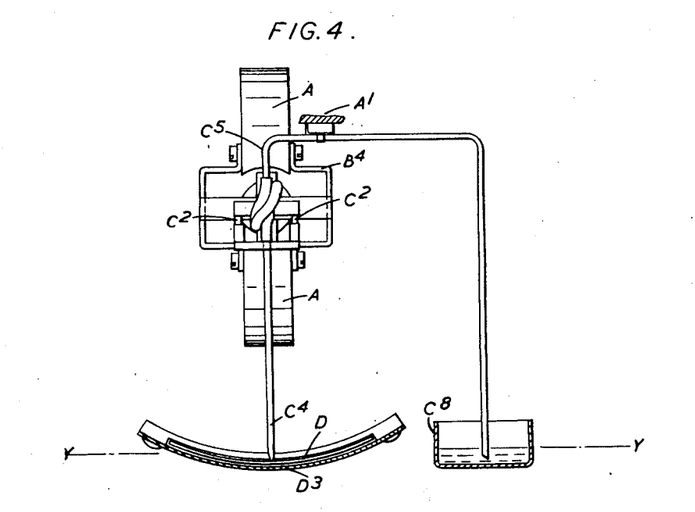
Figure 4 is a view generally similar to that of Figure 2 but of the recorder shown in Figure 3, Figures 5 and 6 illustrate respectively two modified methods of actuating the pen.

It will be understood that any desired form of marking may be used, such for example as ink, pencil, or scribing on waxed paper or by electrical methods. When, however, marking is effected by means of ink, the pen arm $C^3$ is tubular and the ink is fed thereto from a reservoir $C^8$ (Figure 4) the liquid level in which is maintained approximately at that of the median plane Y—Y of the guide $D^3$ for the recording strip D as described above. The ink flows by syphoning from the reservoir $C^8$ to a down feed pipe $C^5$ secured to a fixed part $A^1$ so as to extend in alignment with the upper or receiving end $C^6$ of the tubular pen arm $C^3$ when this lies in its central position as shown in Figure 4. The upper end $C^6$ of the tubular pen arm $C^3$ and the lower end of the down-feed pipe $C^5$ lie respectively below and above the horizontal axis X—X of oscillation of the pen arm $C^3$ and are approximately equidistant from that axis so that a rubber interconnecting tube $C^7$ is free to flex, as the pen arm $C^3$ swings about its axis X—X, without the flexible interconnecting tube $C^7$ tending to alter in length. This interconnecting tube is looped into a curl or bight so as to provide additional freedom of flexure of the tube.

Figure 5:
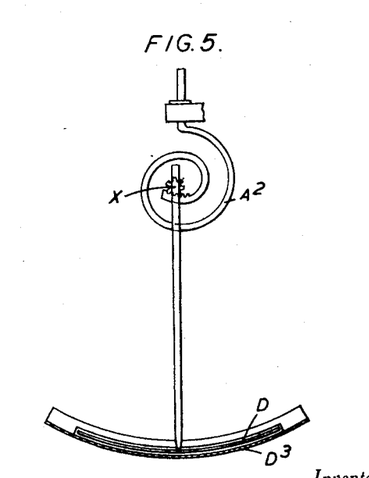
Figure 6:
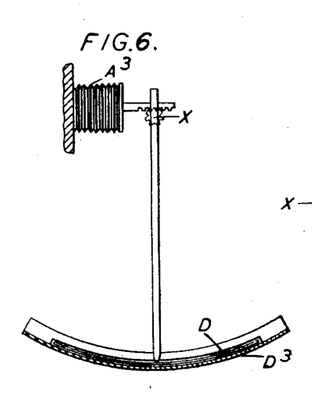

It will be understood that the pen may be operated otherwise than electrically. For example, the pen may be operated by a pressure element such as the Bourdon gauge $A^2$ (Figure 5) or by a temperature responsive element such as the bellows $A^3$ in Figure 6.

Figure 7:
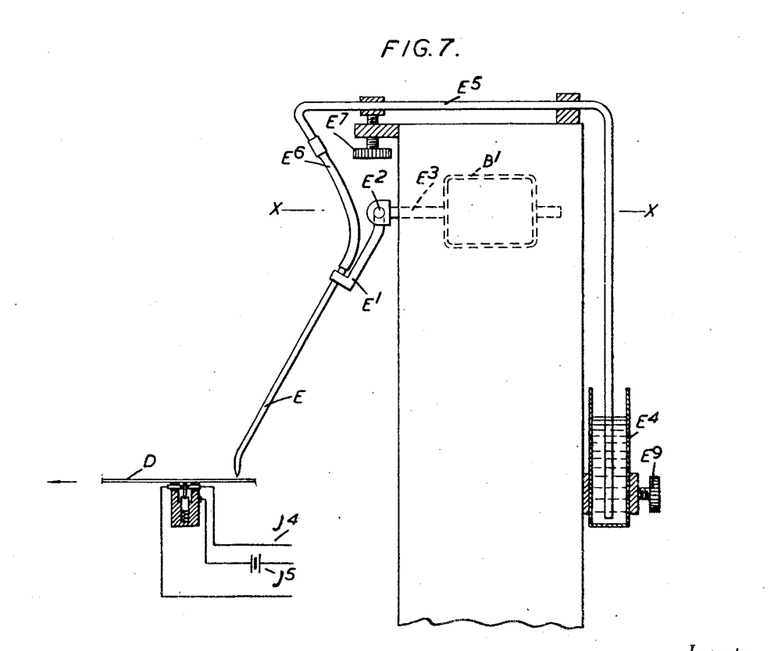
Figure 7 shows, also in side elevation, a modified form of feed for a tubular pen.

In the arrangement shown in Figure 7 the pen E is hollow and is carried by an arm $E^1$ connected to a horizontal pivot $E^2$ at the outer end of a horizontal spindle $E^3$ constituting part of the coil unit $B^1$. The carrier arm $E^1$ and pen E are thus free to swing about the horizontal pivot $E^2$, whilst angular movement of the spindle $E^3$ will positively swing the arm $E^1$ and pen E about the spindle axis X—X, that is to say the axis of oscillation of the pen. The recording surface D, fed through the curved guide (not shown), lies beneath the pen E which is inclined downwards towards the direction of movement of the recording strip as indicated by the arrow.

The pen E is supplied with ink, by induction, from a reservoir $E^4$ and through a metal supply pipe $E^5$ to the upper end of a flexible rubber tube $E^6$ whose lower end is connected to the upper end of the hollow pen E. The length of the rubber tube $E^6$ and the level of the cooperating end of the supply pipe $E^5$ relatively to the paper recording strip D are such that when the pen points bears on the strip D the tube $E^6$ is flexed or "bowed" so that the length of the pen E is generally tangential to the curvature of the flexible tube $E^6$. The pen E and carrier arm $E^1$ are thus free to move about the horizontal pivot $E^2$ under the effect of any irregularities of the surface or curvature of the recording strip D, and the pen point is resiliently held in contact with the strip D. For the purpose of varying the effective resilient biassing force applied to the pen E by the flexible tube $E^6$, a screwthreaded adadjusting stud $E^7$ engages the supply pipe $E^5$ adjacent to that end thereof connected to the upper end of the rubber tube $E^6$, so that by adjustment of the stud $E^7$ the said end of the supply pipe $E^5$ can be moved upwards or downwards to decrease or increase the flexure of the tube $E^6$ and therefore the biassing effect thereof on the pen E bearing on the recording strip D. The reservoir $E^4$ is vertically adjustable, after releasing a stud $E^9$, to regulate the effective ink supply level as desired.

Figure 8:
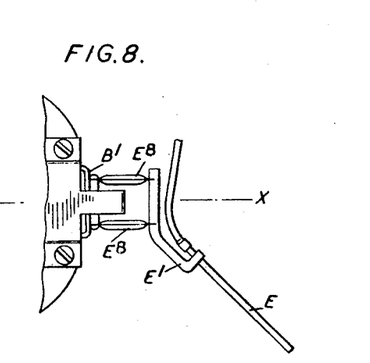
Figure 8 is a fragmentary view of a modification of the pen support shown in Figure 7, Figures 9 and 10 are two examples, in vertical section, of a pen recorder operated in accordance with polar coordinates.

The use of a flexible tube to apply a resilient bias to the pen can be advantageously applied whether the pen extends at an angle to the general direction of travel of the recording surface D, or substantially at right angles thereto since it is only necessary so to arrange the tube that when the pen point bears on the recording surface the tube is flexed. For example, whether the pen is inclined or normal to the general direction of travel of the recording surface D, the flexible tube may have a curl or bight formed therein, as described with reference to Figures 3 and 4, the resilient biassing force being derived from the flexed tube after the manner of a coiled spring. Further, if desired, the pen carrier arm $E^1$, or the pen E itself may be connected to the oscillatory member (e. g. the coil unit $B^1$ when the recorder is of the electrically operated type) through one or more ligament springs $E^8$ (Figure 8) so arranged that while the carrier arm $E^1$ and/or pen E is free to move generally transversely to the axis X—X, angular movement of the pen about this axis is positively transmitted thereto from the coil unit $B^1$ or other oscillatory member of the instrument.

In the construction shown in Figure 9 the pen is connected to the coil $B^1$ as described with reference to Figures 1 and 2, but the axis of oscillation X is displaced to one side of a vertical axis Z—Z about which a flexible disc G, for example of paper, is driven by an electric motor $G^1$ in accordance with an angular coordinate. The recording disc or chart G lies on the upper surface of a housing $G^2$ for the electric motor $G^1$, the part of this surface lying beneath the pen F being curved or dished as described below. The disc G is held in position by an annular guide $G^3$ which, while holding the disc G approximately horizontal on one side of the vertical chart axis Z—Z, causes the disc to be progressively bent or dished on the opposite side of said axis until the part of the disc G which at any moment lies in the plane of oscillation of the point of the pen F is curved about an axis approximately coincident with the axis X of oscillation of the pen F. Thus, the linear coordinate is applied by movement of the pen F about its axis of oscillation X while the angular coordinate is applied by angular movement of the disc or chart G about the vertical chart axis Z.

Figure 9:
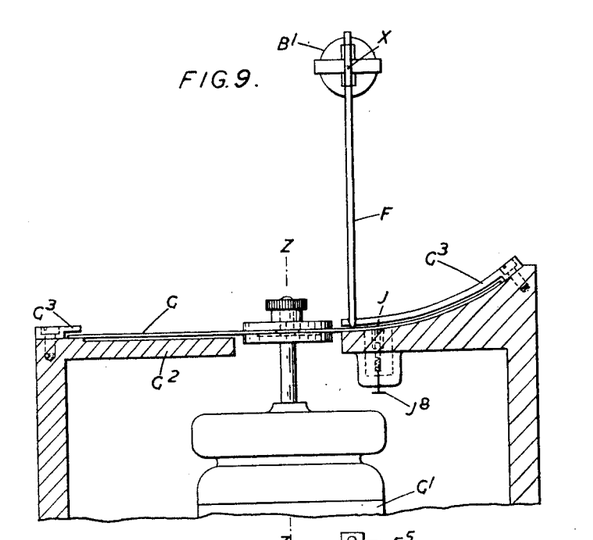
Figure 10:
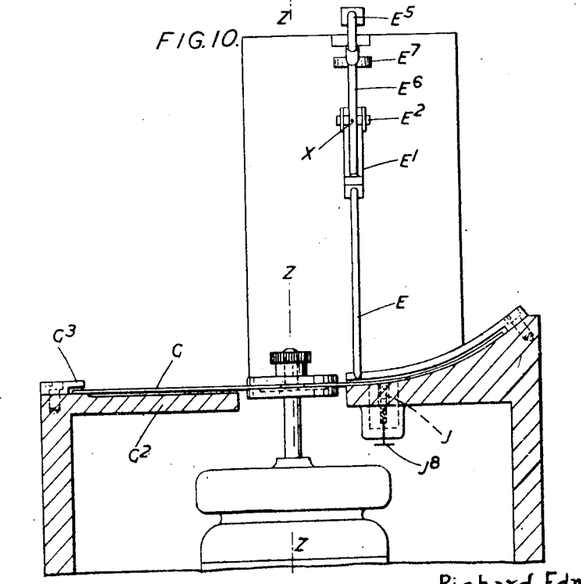

A modification of Figure 9 is shown in Figure 10, wherein the ink is supplied to a tubular pen as described with reference to Figure 7, the pen cooperating with the dished chart G of Figure 9.

With a view to avoiding damage to the pen and/or chart (whether the latter is moved translationally for rectangular cordinate recording as in Figures 1 to 8, or is moved angularly as in Figures 9 and 10 for polar coordinate recording) control means may be provided whereby mutual contact of the pen and recording strip or disc is automatically controlled in accordance with the relative movement between the tip of the pen and the strip or disc. One such arrangement is incorporated in Figure 3 wherein a stop or catch rail $H^1$ carried at the lower end of a lever H, constituting part of an automatic control means for the pen, is disposed beneath the pen arm $C^3$. The lever H is carried on a fixed part $H^2$ by a horizontal pivot $H^3$, the lever H being biassed by a spring $H^4$ which tends to hold the catch rail $H^1$ against the pen $C^3$ thus raising the pen point clear of the surface of the chart D. The upper end portion of the lever H, that is to say the part lying above the pivot $H^3$, constitutes an armature which cooperates with an electromagnet $H^5$ whose coil is connected in series with the energisation circuit of the electric motor $H^6$ which drives the sprocket $D^4$.

Figure 3:
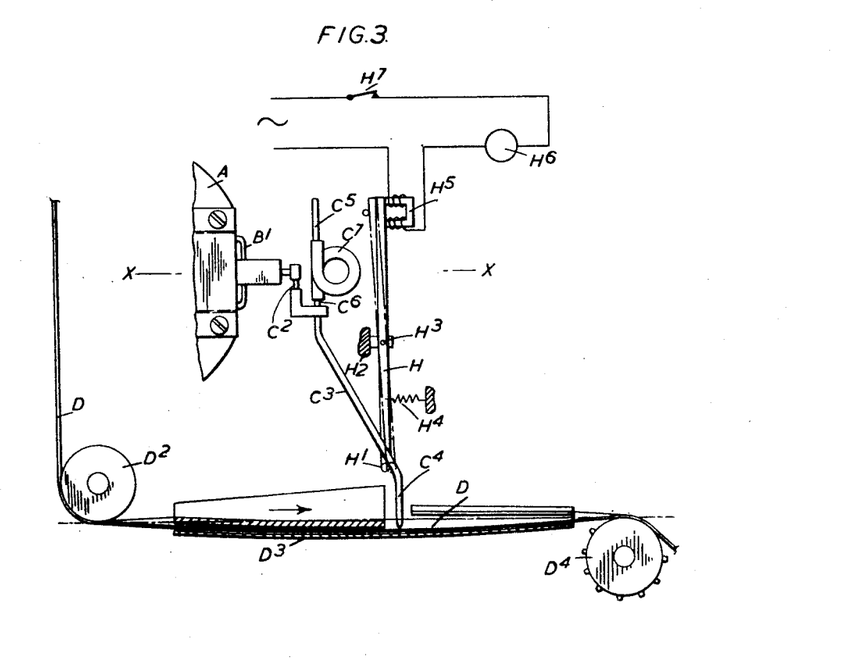
Figure 3 is a view similar to that of Figure 1, but of a modified arrangement.

Thus, with the switch $H^7$ open, the electromagnet $H^5$ is deenergised and the pen $C^3$ is held clear of the recording surface D by the catch rail $H^1$ which is held up by the spring $H^4$ acting on the lever H. The recording surface D can now be removed, or a new strip loaded into the recorder, without risk of damage either to the pen or to the recording surface since the pen point lies clear of the path of movement of the strip whether such movement is in the forward or reverse direction.

Figure 11:
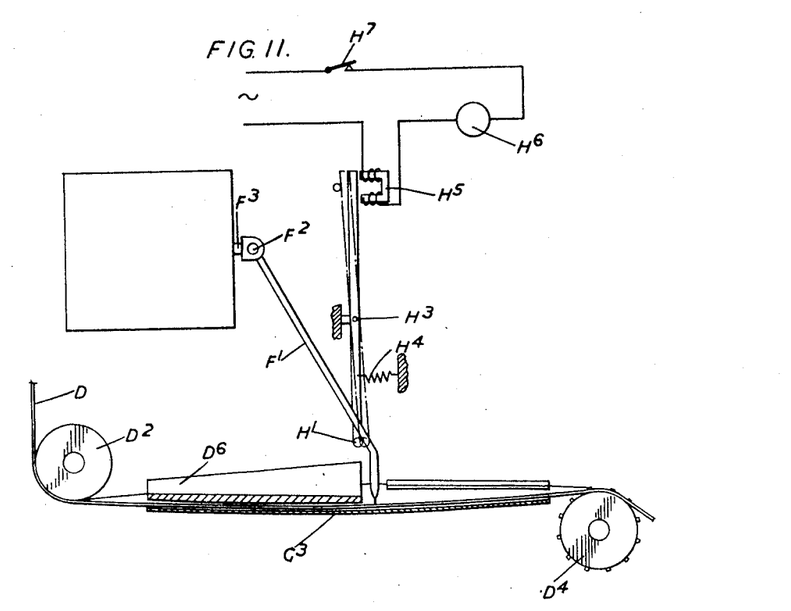
Figure 11 is a modification of the construction shown in Figure 3.

Having inserted a fresh recording strip D, the switch $H^7$ is closed to set the recorder in operation. The electromagnet $H^5$ is thus simultaneously energised so as to rock the pivoted lever H, against the action of its biassing spring $H^4$, and move the catch rail $H^1$ whereby the pen point is lowered on to the recording surface D (as in Figure 3) which is now moving in the normal or forward direction indicated by the arrow. Figure 11 shows a generally similar arrangement used in combination with a marker $F^1$ pivoted at $F^2$ on a spindle $F^3$ connected to the coil unit (not shown) of the recorder.

Figure 12:
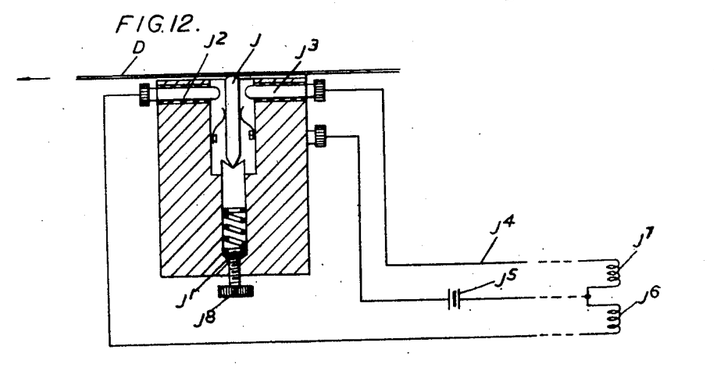
Figure 12 shows, in vertical section and on an enlarged scale, part of the control means included in Figure 7.

If desired, mutual contact of the pen and recording surface or chart may be controlled by the movement of the chart itself. One such arrangement is incorporated in Figure 7 wherein the strip D (whose guide $G^3$ has been omitted for the sake of clarity) rides over, and thus frictionally bears against, a flexible or flexibly mounted control member or finger J (Figure 12) which is resiliently urged into contact with the surface of the strip D by a spring $J^1$ whose effective force may be adjusted by a stud $J^8$. The finger J constitutes the movable contact of a switch whose fixed contacts $J^2$, $J^3$ are connected to an auxiliary electric circuit $J^4$, including a battery $J^5$, for controlling the level of the point of the pen E. When the recording strip D moves in its normal or forward direction indicated by the arrow, the finger J is flexed into engagement with the associated fixed contact $J^2$ thus energising a solenoid $J^6$ which causes the pen E to contact the recording surface D. Should the strip move, even slightly, in the reverse direction (i. e. in the direction opposite to the arrow), the finger J will be brought to bear against the associated contact $J^3$ whose solenoid $J^7$ will thus be energised to lift the pen clear of the recording surface.

It will be apparent that the pen or marker need not necessarily cooperate with the recording surface or chart by actual contact therewith since, for example, marking may be effected by a spark discharge at a sufficiently high potential, or the marker may be constituted by a nozzle which blows a jet of gas on to the recording surface which is suitably sensitized.

Whether the recorder itself is actuated mechanically or electrically, the automatic means for controlling the mutual contact of the pen and recording surface or chart may be either electrical or mechanical, or a combination of both. Electrical control means will, however, usually be preferred, particularly when the pen is to be moved away from the recording surface immediately the recording strip or disc moves in the direction which is the reverse of the normal or forward feed since retraction of the pen must be effected by a reverse movement of the recording surface which is less than that necessary to damage the pen or chart.

Further, the automatic control of the contact between the pen and the recording strip is equally applicable whether the recording surface is moved linearly or angularly. For example, in each of Figures 9 and 10 the recording disc G rests on a spring loaded finger J as described with reference to Figure 12, this finger controlling the pen according to the direction of movement of the disc G about the chart axis Z—Z.

What I claim as my invention and desire to secure by Letters Patent is:

1. Recording apparatus comprising a main pivot, a marker arm, means directly connecting the main pivot to that end portion of the marker arm adjacent to the main pivot and remote from the free or operative end of the arm, said connecting means being yieldable about at least one subsidiary axis at right angles to the axis of the main pivot, means whereby the marker arm is moved about the axis of the main pivot in accordance with one or two coordinates to be recorded by the marker arm on a flexible recording sheet, an arcuate guide for said sheet, the guide being curved about an axis coaxial with the main pivot so that the recording sheet is, adjacent to the free end of the marker arm, cylindrically flexed about the axis of the main pivot, and means effecting relative movement, in a direction parallel to the axis of the main pivot, between the recording sheet and marker arm in accordance with the other coordinate, the marker arm, whose free end cooperates with the concave surface of the recording sheet, being movable as a unit about said subsidiary axis in a plane containing the axis of the main pivot.

2. Recording apparatus as claimed in claim 1, in which the yielding connection between the main pivot and the marker arm comprises at least one spring ligament having its two ends respectively connected to the main pivot and to the adjacent end portion of the marker arm.

3. Recording apparatus as claimed in claim 1, having control means whereby mutual contact of the marker arm and recording sheet is automatically controlled in accordance with relative movement between the recording sheet and marker arm in a direction parallel to the axis of the main pivot.

4. Recording apparatus as claimed in claim 3, in which the recording sheet moves relatively to the marker arm in a direction parallel to the axis of the main pivot, and the control means is operated by the recording sheet.

5. Recording apparatus comprising a main pivot, a marker arm, means directly connecting the main pivot to that end portion of the marker arm adjacent to the main pivot and remote from the free or operative end of the arm, said connecting means being yieldable about at least one subsidiary axis at right angles to the axis of the main pivot, means whereby the marker arm is moved about the axis of the main pivot in accordance with one of two coordinates to be recorded by the marker arm on a flexible recording sheet, an arcuate guide for said sheet, the guide being curved about an axis coaxial with the axis of the main pivot so that the recording sheet is, adjacent to the free end of the marker arm, cylindrically flexed about the axis of the main pivot, means effecting movement of the recording sheet in a direction which, at the free end of the marker arm, is parallel to the axis of the main pivot in accordance with the second coordinate, the marker arm, whose free end cooperates with the concave surface of the recording sheet, being movable as a unit about said subsidiary axis in a plane containing the axis of the main pivot, means biasing the marker arm, about the subsidiary axis, away from the recording sheet, an electric solenoid which, when energized, acts in opposition to said biasing means, and an electric control switch controlling the supply of power to the solenoid so that, when the switch is open, the biasing means holds the pen arm clear of the recording sheet and when the switch is closed the solenoid counteracts said biasing means and causes the marker arm to be lowered on to said sheet.

6. Recording apparatus as claimed in claim 5, in which the marker arm is turned about the axis of the main pivot by an electric motor the supply of power to which is determined by the control switch.

7. Recording apparatus comprising a main pivot, a marker arm, means directly connecting the main pivot to that end portion of the marker arm adjacent to the main pivot and remote from the free or operative end of the arm, said connecting means being yieldable about at least one subsidiary axis at right angles to the axis of the main pivot, means whereby the marker arm is moved about the axis of the main pivot in accordance with one of two coordinates to be recorded by the marker arm on a flexible recording sheet, an arcuate guide for said sheet, the guide being curved about an axis coaxial with the axis of the main pivot so that the recording sheet is, adjacent to the free end of the marker arm, cylindrically flexed about the axis of the main pivot, means effecting movement of the recording sheet in a direction which, at the free end of the marker arm, is parallel to the axis of the main pivot and in accordance with the second coordinate, the marker arm, whose free end cooperates with the concave surface of the recording sheet, being movable as a unit about said subsidiary axis in a plane containing the axis of the main pivot, a solenoid whereby the marker arm is moved away from the recording sheet, a second solenoid whereby the marker arm is restored to said sheet, and an electric switch operated by the recording sheet and selectively controlling the energization of said solenoids in accordance with the direction of movement of the recording sheet.

8. Recording apparatus comprising a main pivot, a tubular marker arm, means directly connecting the main pivot to that end portion of the marker arm adjacent to the main pivot and remote from the free or operative end of the arm, said connecting means being yieldabde about at least one subsidiary axis at right angles to the axis of the main pivot, means whereby the marker arm is moved about the axis of the main pivot in accordance with one of two coordinates to be recorded by the marker arm on a flexible recording sheet, an arcuate guide for said sheet, the guide being curved about an axis coaxial with the main pivot so that the recording sheet is, adjacent to the free end of the marker arm, cylindrically flexed about the axis of the main pivot, a rigid ink supply conduit, a flexible tube connecting the delivery end of the supply conduit to the receiving end of the tubular marker arm, and means effecting relative movement, in a direction parallel to the axis of the main pivot, between the recording sheet and cooperating free end of the marker arm in accordance with the other coordinate, the marker arm, whose free end cooperates with the concave surface of the recording sheet, being movable as a unit, about said subsidiary axis and against the springy action of the flexible tube, in the direction of movement of the recording sheet and in a plane containing the axis of the main pivot.

9. Recording apparatus as claimed in claim 8, in which the spacing between the delivery end of the ink supply conduit and the receiving end of the marker arm, when this contacts the recording sheet, is less than the effective length of the flexible tube, and means are provided for adjusting the said spacing so as to vary the initial flexure of the flexible tube.

10. Recording apparatus comprising a main pivot, a marker arm, means directly connecting the main pivot to that end portion of the marker arm adjacent to the main pivot and remote from the free or operative end of the arm, said connecting means being yieldable about at least one subsidiary axis at right angles to the axis of the main pivot, means whereby the marker arm is moved about the axis of the main pivot in accordance with one of two polar coordinates to be recorded by the marker arm on a flexible recording disc, a support for said disc, an arcuate guide on said support, and adjacent to the free end of the marker arm, said guide being curved about an axis coaxial with the main pivot, means whereby the disc is rotated, in accordance with the other polar coordinate, on said support and through the guide about a chart axis at right angles to but laterally spaced from the axis of the main pivot, so that the part of the disc adjacent to the free end of the marker arm is cylindrically flexed about the axis of the main pivot and moves in a direction parallel to the axis of the main pivot, the marker arm, whose free end cooperates with the concave surface of the recording disc, being movable as a unit about said subsidiary axis in a plane containing the axis of the main pivot.

11. Recording apparatus as claimed in claim 10, having control means whereby mutual contact of the marker arm and recording disc is automatically controlled in accordance with the movement of the disc relatively to the free end of the marker arm in a direction parallel to the axis of the main pivot.

12. Recording apparatus as claimed in claim 11, in which the control means is operated by the recording disc.

13. Recording apparatus as claimed in claim 12, in which the control means comprises a solenoid whereby the marker arm is moved away from the recording disc, a second solenoid whereby the marker arm is restored to said disc, and an electric switch operated by the recording disc and selectively controlling the energization of said solenoid in accordance with the direction of movement of the recording disc about the chart axis.

14. Recording apparatus comprising a main pivot, a tubular marker arm, means directly connecting the main pivot to that end portion of the marker arm adjacent to the main pivot and remote from the free or operative end of the arm, said connecting means being yieldable about at least one subsidiary axis at right angles to the axis of the main pivot, means whereby the marker arm is moved about the axis of the main pivot in accordance with one of two polar coordinates to be recorded by the marker arm on a flexible recording disc, a support for said disc, an arcuate guide on said support and adjacent to the free end of the marker arm, said guide being curved about an axis coaxial with the main pivot, means whereby the disc is rotated, in accordance with the other polar coordinate, on said support and through the guide about a chart axis at right angles to but laterally spaced from the axis of the main pivot so that the part of the disc adjacent to the free end of the marker arm is cylindrically flexed about the axis of the main pivot and moves in a direction parallel to the axis of the main pivot, a rigid ink supply conduit, a flexible tube connecting the delivery end of the supply conduit to the receiving end of the tubular marker arm whose free end cooperates with the concave surface of the disc, the marker arm being movable as a unit, about said subsidiary axis and against the spring action of the flexible tube, in the direction of movement of the disc and in a plane containing the axis of the main pivot.

15. Recording apparatus as claimed in claim 14, in which the spacing between the delivery end of the ink supply conduit and the receiving end of the marker arm, when this contacts the recording disc, is less than the effective length of the flexible tube, and means are provided for adjusting the said spacing to vary the initial flexure of the flexible tube.

16. Recording apparatus comprising a main pivot, a marker arm connected to the main pivot, means whereby the marker arm is moved about the axis of the main pivot in accordance with one of two polar coordinates to be recorded by the marker arm on a flexible recording disc, a support for said disc, a guide on said support adjacent to the free or operative end of the marker arm, the guide being curved about an axis coaxial with the axis of the main pivot, and means whereby said disc is turned about a chart axis, in accordance with the other polar coordinate, so that the part of the disc where this cooperates with the free end of the marker arm is cylindrically curved by the guide about the axis of the main pivot and moves in a direction parallel to the main axis, the free end of the marker arm cooperating with the concave surface of the recording disc.

17. Recording apparatus as claimed in claim 16, in which the chart axis is at right angles to the axis of the main pivot but is laterally displaced to that side thereof remote from the guide.

18. Recording apparatus as claimed in claim 16, having control means whereby mutual contact of the marker arm and recording disc is automatically controlled in accordance with the movement of the disc relatively to the free end of the marker arm in a direction parallel to the axis of the main pivot.

19. Recording apparatus as claimed in claim 18, in which the control means is operated by the recording disc.

20. Recording apparatus as claimed in claim 18, in which the control means comprises a solenoid whereby the marker arm is moved away from the recording disc, a second solenoid whereby the marker arm is restored to said disc, and an electric switch operated by the recording disc and selectively controlling the energization of said solenoids in accordance with the direction of movement of the recording sheet about the chart axis.

21. Recording apparatus comprising a main pivot, a marker arm, means directly connecting the main pivot to that end portion of the marker arm adjacent to the main pivot and remote from the free or operative end of the arm, said connecting means being yieldable about at least one subsidiary axis at right angles to the axis of the main pivot, means whereby the marker arm is moved about the axis of the main pivot in accordance with one of two coordinates to be recorded by the marker arm on a flexible recording sheet, an arcuate guide for said sheet, the guide being curved about an axis coaxial with the axis of the main pivot so that the recording sheet is, adjacent to the free end of the marker arm, cylindrically flexed about the axis of the main pivot, means effecting movement of the recording sheet in a direction which, at the free end of the marker arm, is parallel to the axis of the main pivot in accordance with the second coordinate, the marker arm, whose free end cooperates with the concave surface of the recording sheet, being movable as a unit about said subsidiary axis in a plane containing the axis of the main pivot, means biasing the marker arm about the subsidiary axis with respect to the recording sheet, and an electric circuit having a solenoid and switch means therein for causing the marker arm to move with respect to said sheet notwithstanding said biasing means.

RICHARD EDMUND REASON.

REFERENCES CITED

The following references are of record in the file of this patent:

UNITED STATES PATENTS

| Number | Name | Date |
|---|---|---|
| 289,603 | Barton | Dec. 4, 1883 |
| 1,347,787 | Mapelsden | July 27, 1920 |
| 1,523,345 | Madsen | Jan. 13, 1925 |
| 1,635,324 | Jenkins | July 12, 1927 |
| 2,003,913 | Wente | June 4, 1935 |
| 2,099,180 | Stevens | Nov. 16, 1937 |
| 2,184,973 | Finch | Dec. 26, 1939 |
| 2,189,560 | Culbertson | Feb. 6, 1940 |
| 2,192,385 | Reason | Mar. 5, 1940 |
| 2,203,057 | Moore | June 4, 1940 |